United States Patent
Carroll et al.

(10) Patent No.: US 6,674,727 B1
(45) Date of Patent: Jan. 6, 2004

(54) DISTRIBUTED RING PROTOCOL AND DATABASE

(75) Inventors: David A. Carroll, Apex, NC (US); John K. Fitzgerald, Cary, NC (US); Kara J. Adams, Raleigh, NC (US); Kenneth H. Potter, Jr., Raleigh, NC (US); Gary William Kramling, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/266,241

(22) Filed: Mar. 10, 1999

Related U.S. Application Data

(60) Provisional application No. 60/110,332, filed on Nov. 30, 1998.

(51) Int. Cl.$^7$ .............................................. H04L 12/417
(52) U.S. Cl. ...................... 370/254; 370/403; 370/410; 370/476
(58) Field of Search ................................. 370/401–408, 370/450–452, 463, 254–258, 410, 474, 476

(56) References Cited

U.S. PATENT DOCUMENTS

| | | | |
|---|---|---|---|
| 4,823,338 A | 4/1989 | Chan et al. ................... 370/85 |
| 4,864,559 A | 9/1989 | Perlman ...................... 370/60 |
| 5,018,133 A | 5/1991 | Tsukakoshi et al. .......... 370/16 |
| 5,027,350 A | 6/1991 | Marshall .................. 370/85.13 |
| 5,088,032 A | 2/1992 | Bosack ...................... 395/200 |
| 5,088,090 A | 2/1992 | Yacoby ................... 370/85.13 |
| 5,095,480 A | 3/1992 | Fenner ...................... 370/94.1 |
| 5,111,453 A | 5/1992 | Morrow ................... 370/85.13 |
| 5,144,622 A | 9/1992 | Takiyasu et al. ......... 370/85.13 |
| 5,280,480 A | 1/1994 | Pitt et al. ................. 370/85.13 |
| 5,309,437 A | 5/1994 | Perlman et al. .......... 370/85.13 |
| 5,323,394 A | 6/1994 | Perlman ................... 370/85.13 |
| 5,394,402 A | 2/1995 | Ross ........................ 370/94.1 |
| 5,408,618 A * | 4/1995 | Aho et al. ................... 710/104 |
| 5,414,704 A | 5/1995 | Spinney ........................ 370/60 |
| 5,444,692 A * | 8/1995 | Basso et al. ................ 370/258 |
| 5,448,565 A | 9/1995 | Chang et al. ............ 370/85.13 |
| 5,491,687 A | 2/1996 | Christensen et al. ........... 370/17 |
| 5,500,860 A | 3/1996 | Perlman et al. .......... 370/85.13 |
| 5,511,168 A | 4/1996 | Perlman et al. ........ 395/200.15 |
| 5,517,620 A | 5/1996 | Hashimoto et al. ..... 395/200.15 |
| 5,617,421 A | 4/1997 | Chin et al. ................... 370/402 |
| 5,623,532 A | 4/1997 | Houde et al. ................. 379/58 |
| 5,633,858 A | 5/1997 | Chang et al. ............... 370/255 |
| 5,684,800 A | 11/1997 | Dobbins et al. ............. 370/401 |
| 5,740,171 A | 4/1998 | Mazzola et al. ............. 370/392 |
| 5,742,604 A | 4/1998 | Edsall et al. ................. 370/401 |
| 5,752,003 A | 5/1998 | Hart .......................... 395/500 |
| 5,764,636 A | 6/1998 | Edsall ........................ 370/401 |
| 5,796,732 A | 8/1998 | Mazzola et al. ............. 370/362 |
| 5,852,607 A | 12/1998 | Chin .......................... 370/401 |
| 5,872,783 A | 2/1999 | Chin .......................... 370/392 |
| 6,304,575 B1 * | 10/2001 | Carroll et al. ............... 370/408 |

OTHER PUBLICATIONS

Overview of Token Ring Switching, Web, http://www.cisco.com/univercd/cc/td/doc/product/lan/trsrb/overview.htm, Oct. 8, 1998, pp. 1–8.

(List continued on next page.)

Primary Examiner—Min Jung
(74) Attorney, Agent, or Firm—Cesari and McKenna, LLP

(57) ABSTRACT

A Distributed Ring Protocol (DRiP) arrangement includes a database and protocol for maintaining and distributing information within a distributed token ring (TR) bridge having a logical switch fabric that is distributed over a TR switching network of switches interconnected by trunk links, such as Inters witch Link (ISL) trunks. The DRiP information is used by switches within the ISL switched fabric to determine the status (configured and/or activated) and association (within a switch) of ports of the distributed bridge.

45 Claims, 11 Drawing Sheets

OTHER PUBLICATIONS

Radia Perlman, *Interconnections: Bridges and Routers*, 1992, pp. 99–125.

Andrew S. Tanenbaum, *Computer Networks, Third Edition*, 1996, pp. 275–318.

Annex K—DTR Concentrator Functional Description, Jul. 31, 1995, pp. K–1 –K–22.

Configuring VTP and Virtual LANs, Cisco Systems, Inc., Feb. 27, 1998, pp. 13–1 –13–24.

A New Protocol For Route Discovery In Multiple–Ring Networks: Part I—The Basic Protocol, Reuven Cohen, Jun. 25, 1997, pp. 488 –498.

The IBM 8209 LAN Bridge, Aamer Latif, Edward J. Rowlance, and R. Holt Adams, May 1992, pp. 28–37.

Understanding Token Ring Switching, Web, http://www.cisco.com/univercd/cc/tduct/lan/cat3900/c3930ug/token.htm, Oct. 8, 1998, pp. 1–22.

Token Ring Inter–Switch Link Feature Summary, web, http://www.cisco.com/univercd/cc/tare/ios113ed/113t/113_4/trisl.htm, Oct. 8, 1998, pp. 1–26.

Draft Standard for Virtual Bridged Local Area Networks, LAN MAN Standards Committee, Feb. 1997, pp. 1–88.

Cisco VLAN Roadmap, web http://www.cisco.com/warp/public/538/7.htm, Jul. 15, 1998, pp. 1–9.

Cisco Announces Token–Ring Switching Products, Apr. 15, 1995, pp. 4–5.

\* cited by examiner

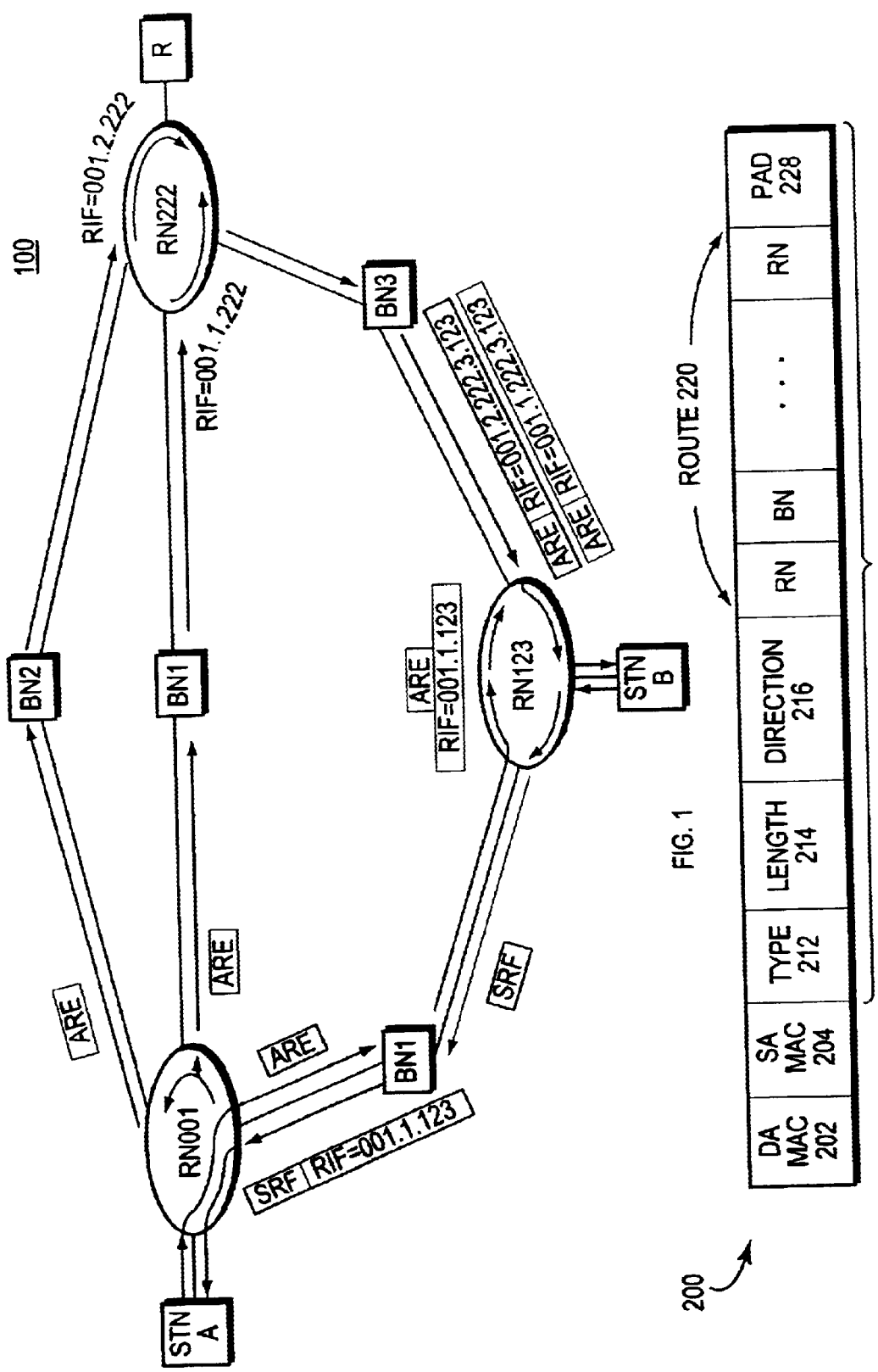

1400

| | B | S | LA | LC | RA | RC | x | x | |
|---|---|---|---|---|---|---|---|---|---|
| 55 | 0 | 0 | 0 | 0 | 0/1 | 1 | | | SW2 |
| 56 | 0 | 0 | 1 | 1 | 0 | 0 | | | SW1 |
| 57 | 0 | 0 | 1 | 1 | 0 | 0 | | | SW1 |
| 58 | 0 | 0 | 0 | 0 | 0/1 | 0/1 | | | SW3 |
| 59 | 1 | 0 | 1 | 1 | 0 | 1 | | | SW1 |
| 1003 | 0 | 1 | 1 | 1 | 1 | 1 | | | SW3 |

FIG. 14

DISTRIBUTED RING PROTOCOL AND DATABASE

REFERENCE TO PROVISIONAL APPLICATION

This patent application claims the benefit under 35 U.S.C. §119(e) of U.S. Provisional Patent Application No. 60/110,332, titled, Distributed Token Ring Bridge Architecture, by Carson Stuart et al. and filed on Nov. 30, 1998; now abandoned, which application is hereby incorporated by reference as though filmy set forth herein.

CROSS-REFERENCE TO RELATED APPLICATIONS

This invention is related to the following copending U.S. Patent Applications: U.S. patent application Ser. No. 09/266,239 titled, Token Ring Bridge Distributed in a Switched Fabric; issued as U.S. Pat. No. 6,563,832 on May 13, 2003.

U.S. patent application Ser. No. 09/266,198 titled, Backup CRF VLAN; filed Mra. 10, 1999, and U.S. patent application Ser. No. 09/265,668 titled, Switched Token Ring over ISL (TR-ISL) Network, filed Mar. 10, 1999, which application is pending, each of which was filed on even date herewith and assigned to the assignee of the present invention.

BACKGROUND OF THE INVENTION

Communication in a computer internetwork involves the exchange of data between two or more entities interconnected by communication media configured as local area networks (LANs) and wide area networks (WANs). The entities are typically software programs executing on hardware computer platforms, such as end stations and intermediate stations. In particular, communication software executing on the end stations correlate and manage data communication with other end stations. The stations typically communicate by exchanging discrete packets or frames of data according to predefined protocols. A protocol, in this context, consists of a set of rules defining how the stations interact with each other. For example, a LAN employs a data communication protocol (LAN standard), such as Token Ring, Ethernet or Token Bus, that defines the functions performed by the data link and physical layers of a communications architecture (i.e., a protocol stack).

To form a WAN, one or more intermediate devices are often used to interconnect multiple LANs. A bridge is an example of an intermediate station that may be used to provide a "bridging" function between two or more LANs to form a relatively small domain of stations, such as a subnetwork. Subnetworks or subnets provide an organizational overlay to an internetwork that facilitates transmission of data between the end stations. switch may be utilized to provide a "switching" function for transferring information, such as data frames, between LANs. Typically, the switch is a computer having a plurality of ports that couple the switch to several LANs and to other switches. The switching function includes receiving data frames at an inbound port and transferring them to at least one outbound port of the switch. A router is an intermediate station that interconnects subnets and executes network routing software to allow expansion of communication to end stations of other subnets. Collectively, these hardware and software components comprise a communications internetwork.

FIG. 1 is a schematic block diagram of a conventional Token Ring (TR) internet-work 100 comprising a plurality of TR LANs interconnected by conventional bridges and a router (R). Each token ring is assigned a ring number (RN), such as RN001, RN222 and RN123, and each bridge is assigned a bridge number (BN), such as BN1–3. The RNs assigned to the token rings must be unique within each bridged TR subnetwork that extends to the router. That is, RNs assigned to the token rings within each subnetwork must be different, although BNs assigned to the bridges within each subnetwork may be similar. An exception to this latter rule involves the use of redundant bridges coupling common TR LANs; here, the redundant bridges must have unique BNs in order to distinguish one another.

In the TR internetwork, there may be multiple paths between a source end station and a destination end station. To send a TR frame from a source (such as Station A) to a destination (such as Station B) along a particular path of the internetwork, the source may insert information within a routing information field (RIF) of the frame that specifies the particular path to the destination. FIG. 2 is a schematic diagram of a portion of a conventional TR frame 200 comprising destination address (DA) and source address (SA) medium access control (MAC) fields 202–204 and a RIF header 210. The RIF header 210, in turn, comprises a type (TYPE) field 212, a RIF length indicator (LENGTH) field 214, a direction bit (DIRECTION) field 216 and a ROUTE field 220 that may include a plurality of RN/BN pairs needed to describe the path. Each RN/BN pair comprises 2 bytes, wherein the RN is 12 bits and the BN is 4 bits. The RIF header 210 terminates with a 4-bit padding (PAD) field 228 of zeros.

The source typically acquires the information for insertion into the RIF through the issuance of a special TR frame called an All Routes Explorer (ARE) frame that is broadcasted throughout the TR subnetwork. An ARE frame is typically used to find all paths to a particular destination; an example of a frame used to strictly find the destination is a Spanning Tree Explorer (STE) frame. The STE frame only propagates over network segments that are along a defined spanning tree path to the destination; consequently, the destination only receives one copy of the frame. Execution of a spanning tree algorithm within the bridges results in blocking of certain ports to obviate propagation of frames around loops.

Source Route Bridging (SRB) describes a bridging technique that forwards TR frames based on the RIF information stored in the frame; an example of a frame that has a RIF is called a Specifically Routed Frame (SRF). In contrast, Transparent Bridging (TB) is a bridging technique that forwards TR frames based on their MAC addresses using a forwarding table. Source Route Transparent (SRT) bridging is a merging of the SRB and TB techniques; that is, if there is a RIF in the frame transported over an SRT bridge network, forwarding decisions are based on that RIF, whereas if there is no RIF in the frame, forwarding decisions are made based on the MAC address of the frame using the forwarding table. A TR frame that does not have a RIF is called a Non-Source Route (NSR) frame.

When issuing an ARE frame, the source (Stn A) initially sets the RIF length 214 to "2" (the length of the header 210) signifying that there is no information contained in the route field 220 of the RIF, and loads the type field 212 of the header with information specifying the type of frame, e.g., an ARE frame. Stn A then transmits the ARE frame over token ring RN001 where it is received by each station, including each bridge, connected to the token ring. Upon receiving the frame, each bridge inserts information into the RIF prior to forwarding a copy of the ARE frame onto its connected token ring.

In general, each bridge inserts into the RIF (i) its bridge number and (ii) the ring number of the token ring to which it is forwarding the frame; however, when a bridge receives an ARE frame having a RIF length of "2", the bridge also inserts into the RIF the ring number of the token ring from which the frame is received. For example, a first BN1 inserts into the RIF the following information: the RN of the token ring from which the frame is received, its BN and the RN of the ring to which it is forwarding the frame <001.1.123>. The contents of the RIF thus describe the path followed by the ARE frame to reach token ring RN123.

The RIF contents for other copies of the ARE frame broadcasted throughout the TR subnetwork include (i) RIF= <001.1.222> and (ii) RIF=<001.2.222>. These copies of the ARE frame are forwarded over RN222 and the bridges connected to the ring update the RIF of the ARE frames prior to forwarding them to their connected LANs. For example when bridge BN3 forwards the ARE frame to RN123, it updates the RIF header 210, including the length field 214, as a result of inserting its bridge number and connected ring number into the RIF. Thus, the contents of the RIF of an ARE frame propagating over RN123 are <001.1.222.3.123>. Destination (Stn B) receives three ARE frames, one of which has a RIF with contents <001.1.123>, another having RIF contents <001.1.222.3.123> and a third having RIF contents of <001.2.222.3.123>.

Stn B chooses one of the ARE frames (and its RIF contents) as the route over which it returns a response frame; typically, the destination chooses the frame it received first, which may be the frame having the shortest RIF to the source. Stn B thus returns a SRF frame to the source over a path <001.1.123> specified in the RIF. The frame type is indicated as a SRF frame and the direction bit is altered to enable interpretation of the contents of the RIF. In the case of a response frame, the direction bit is inverted to denote that the RIF contents are interpreted in a reverse direction to describe the path to the source.

In general, a properly functioning bridge does not forward a copy of a STE frame or an ARE frame back over a token ring from which it has already traversed. When the ARE frame is "flooded" over RN001, one copy of the frame is received by bridge BN2 and forwarded to RN222, while another copy of the frame is received at a second BN1 and forwarded to RN222. Because each of these bridges reside on the same token ring, the copy of the frame forwarded over RN222 from BN2 is received by BN1 and, similarly, the copy of the frame forwarded over RN222 by BN1 is received by BN2. Yet, those bridges do not forward copies of the frames back onto RN001 because the ARE frames previously traversed that ring. Specifically, BN1 examines the contents of the RIF and, upon detecting that the ARE frame had previously traversed RN001, blocks its port to that token ring. Blocking of the port effectively discards the frame and prevents it from circulating endlessly around a loop, while also preventing end stations from receiving multiple copies of the frame.

A token ring network is typically implemented through the use of TR concentrators (or "hubs") interconnected in a "daisy chain" manner, wherein each concentrator is coupled to end stations via point-to-point wire cables 310. FIG. 3 is a schematic diagram of a conventional TR concentrator network arrangement 300. Collectively, the interconnected concentrators 302–308 form a physical loop/ring configuration that starts at a first TR concentrator 302 and continues through each end station coupled to the concentrator; this configuration extends to each connected TR concentrator up to a last concentrator 308, where it "loops-back" to the first concentrator. Access to the ring is determined in accordance with a token message that propagates among all of the end stations coupled to the ring. A problem with this conventional network arrangement involves the limited bandwidth available to each station over the cables 310; for example, all stations coupled to the physical token ring share 16 megabits per second (Mbps) of bandwidth. In contrast, intermediate stations (switches) in an Ethernet environment are interconnected by 100 Mbps "pipes" that increase the bandwidth available per station.

One way to achieve additional bandwidth in a token ring environment is to apportion the token ring into smaller sub rings, each of which is coupled to a bridge. Yet, apportioning a token ring network into subrings requires careful consideration because of the limitations associated with token ring networks. Since each ring number comprises 12 bits, there is only a finite number of ring numbers available per subnet. The total length of the RIF of a TR frame is less than or equal to 30 bytes, thus limiting the RIF to a total of fourteen (14) RN/BN pairs for the typical TR frame 200. Moreover, subrings do not generally scale well for modern networking environments wherein each server coupled to the network requires its own TR concentrator to achieve necessary bandwidth requirements.

Another approach to increasing bandwidth in a token ring environment involves the use of intermediate stations that are compatible with the Dedicated Token Ring (DTR) bridge standard promulgated by the Institute of Electrical and Electronics Engineers (IEEE) in Annex K to the IEEE 802.5 standard (hereinafter "Annex K"), which governs token ring LANs. Annex K defines a 2-tier switching model for a single LAN switch containing a Bridge Relay Function (BRF) to bridge between ports of different ring numbers and a Concentrator Relay Function (CRF) to switch between ports of the same ring number.

FIG. 4 is a schematic diagram of a switch 400 containing a plurality of CRFs (CRF111–333) coupled to a BRF1 to provide bridging and switching operations among physical token ring (TR) media/segments coupled to the switch. Each CRF has a plurality of TR ports that interconnect a plurality of TR segments into one logical token ring having a single ring number. This arrangement is advantageous because it increases the total available bandwidth per logical token ring. That is, for a 4-port switch arrangement, a total of 64 MB of bandwidth is available for, e.g., CRF111.

Functionally, the CRF "switches" TR frames from one TR segment to another, while the BRF "bridges" those frames between different CRFs. That is, rather than or in addition to forwarding frames from one TR segment to another, CRF111 may pass them to its associated BRF1 which may, in turn, forward the frames to CRF222. CRF222 may then forward the frames over one of its TR segments. Thus, the 2-tier switching model allows BRF1 to transfer TR frames between different logical token ring numbers.

FIG. 5 is a schematic block diagram of a conventional bridging arrangement 500 comprising a plurality of switches SW1–2 with a plurality of BRFs (BRF1–3), each of which is coupled to a plurality of CRFs. In general, coupling of a BRF to the CRFs forms a subnetwork; multiple subnetworks may then be interconnected by a router (R) located internal (or external) to a switch. However, a CRF may be extended from one physical location to another using a wire 510 that connects one port of the CRF in a switch to another port of the CRF in another switch.

For example, CRF222 may be defined in each switch SW1–2 and its function logically extended between the switches by coupling two ports through the wire 510. Although this enables its ports to occupy a single logical ring number, CRF222 is logically coupled between two different BRFs (BRF1 and BRF2). Each BRF in the switches has an assigned bridge number and constitutes a bridge hop. Notably, the wire 510 used to couple the CRF ports of the switches SW1–2 is generally similar to the cable 310 coupling stations/concentrators of a token ring and, thus, supports 16 Mbps of bandwidth.

In addition to subnets, a computer internetwork may be segregated into a series of network groups. For example, U.S. Pat. No. 5,394,402, to Ross (the "'402 Patent") discloses an arrangement that is capable of associating any port of a switch with any particular segregated network group. According to the '402 Patent, any number of physical ports of a particular switch may be associated with any number of groups within the switch by using a virtual local area network (VLAN) arrangement that virtually associates the port with a particular VLAN designation. Ross discloses a system that associates VLAN designations with at least one internal switch port and further associates those VLAN designations with messages transmitted from any of the ports to which the VLAN designation has been assigned. Thus, those entities having the same VLAN designation function as if they are all part of the same LAN.

The VLAN designation for each internal port is stored in a memory portion of the switch such that every time a message is received by the switch on an internal port the VLAN designation of that port is associated with the message. Association is accomplished by a flow processing element which looks up the VLAN designation in a memory based on the internal port where the message originated. Message exchanges between parts of the network having different VLAN designations are specifically prevented in order to preserve the boundaries of each VLAN segment. In addition to the '402 patent, the Institute of Electrical and Electronics Engineers (IEEE) is preparing a standard for Virtual Bridged Local Area networks. See IEEE Standard 802.1q (draft).

U.S. Pat. No. 5,742,604, titled Inters witch Link Mechanism for Connecting High-Performance Network Switches, by Edsall et al. (the "'604 patent") discloses an interswitch link (ISL) encapsulation mechanism for efficiently transporting packets or frames, including VLAN-modified frames, between switches while maintaining the VLAN association of the frames. This patent, which is commonly owned with the present application, discloses an ISL link that connects ISL interface circuitry disposed at two switches. The transmitting ISL circuitry encapsulates the frame being transported within an ISL header and ISL error detection information, while the ISL receiving circuitry strips off this information and recovers the original frame.

U.S. patent application Ser. No. (112025-103), titled Token Ring Bridge Distributed in a Switched Fabric by Carson Stuart et al, discloses a distributed TR bridge having a logical switch fabric that is distributed over a TR switching network of switches interconnected by trunk links, which may comprise ISL links. When implementing VLANS using a distributed TR bridge in an ISL switched network, each switch must be aware of the existence of configured and activated TR ports in the other switches. The present invention provides an arrangement for maintaining and ensuring the accuracy of such information.

SUMMARY OF THE INVENTION

The invention relates to a Distributed Ring Protocol (DRiP) arrangement that includes a database and protocol for maintaining and distributing information within a logical switch fabric that is distributed over a TR switching network of switches interconnected by trunk links, such as Interswitch Link (ISL) trunks. The information is used by switches within the ISL switched fabric to determine the status (configured and/or activated) and association (within a switch) of ports of the distributed bridge.

In the illustrative embodiment, the DRiP database is dynamically constructed and maintained in each switch of the switching fabric, and comprises ring numbers and the status of ports associated with the ring numbers within the ISL-connected network of switches. In particular, the DRiP database includes virtual local area network (VLAN) identifiers (IDs) that map to ring numbers/Concentrator Relay Functions (CRFs) and their is associated ports. The database further includes indications as to the status of the ports mapped to the VLAN IDs.

The DRIP protocol is employed to distribute the information contained in the DRiP database among the switches of the switching fabric. Specifically, the DRiP protocol defines a communication message exchange between switches of an ISL switching fabric, wherein the messages are exchanged both periodically and when there is a change in status of any VLAN ID. These periodic and specifically-issued message exchanges enable creation of the DRIP database within each switch and further ensure coherency of the DRiP databases maintained by the switches.

Advantageously, the DRiP database and protocol cooperate to limit all routes explorer (ARE) frames coming into each switch of the network cloud, as well as control (and allow under certain circumstances) the formation of a virtual CRF loop created by the (TR) ISL links of the distributed switching environment. The inventive DRiP arrangement further communicates real-time status of TR VLANs in a switched TR environment, thereby obviating static configuration of that environment.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 1 is a schematic block diagram of a conventional Token Ring (TR) internet work comprising a plurality of TR local area networks interconnected by conventional bridges and a router;

FIG. 2 is a schematic diagram of a portion of a conventional TR frame;

FIG. 14 is a schematic diagram of the organization of a novel DRiP database according to the invention.

DETAILED DESCRIPTION OF AN ILLUSTRATIVE EMBODIMENT

Figure 3:
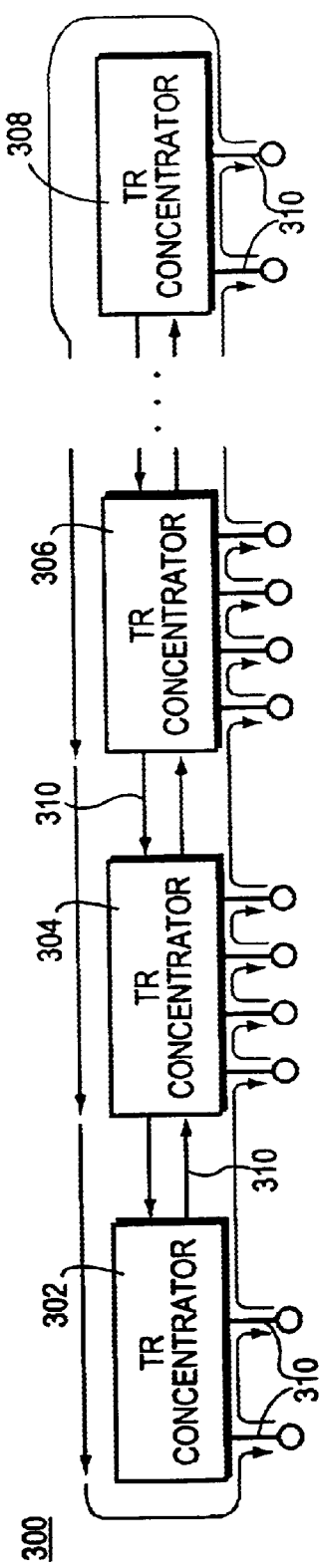
FIG. 3 is a schematic diagram of a conventional TR concentrator network arrangement.
Figure 4:
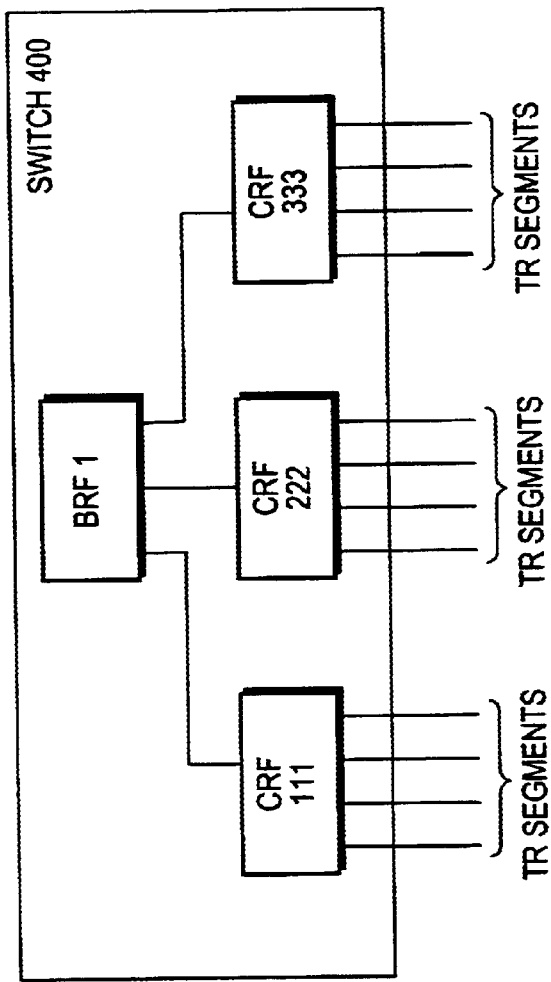
FIG. 4 is a schematic diagram of a switch containing a plurality of Concentrator Relay Functions (CRFs) coupled to a Bridge Relay Function (BRF) to provide bridging and switching operations among physical TR media/segments coupled to a switch.
Figure 5:
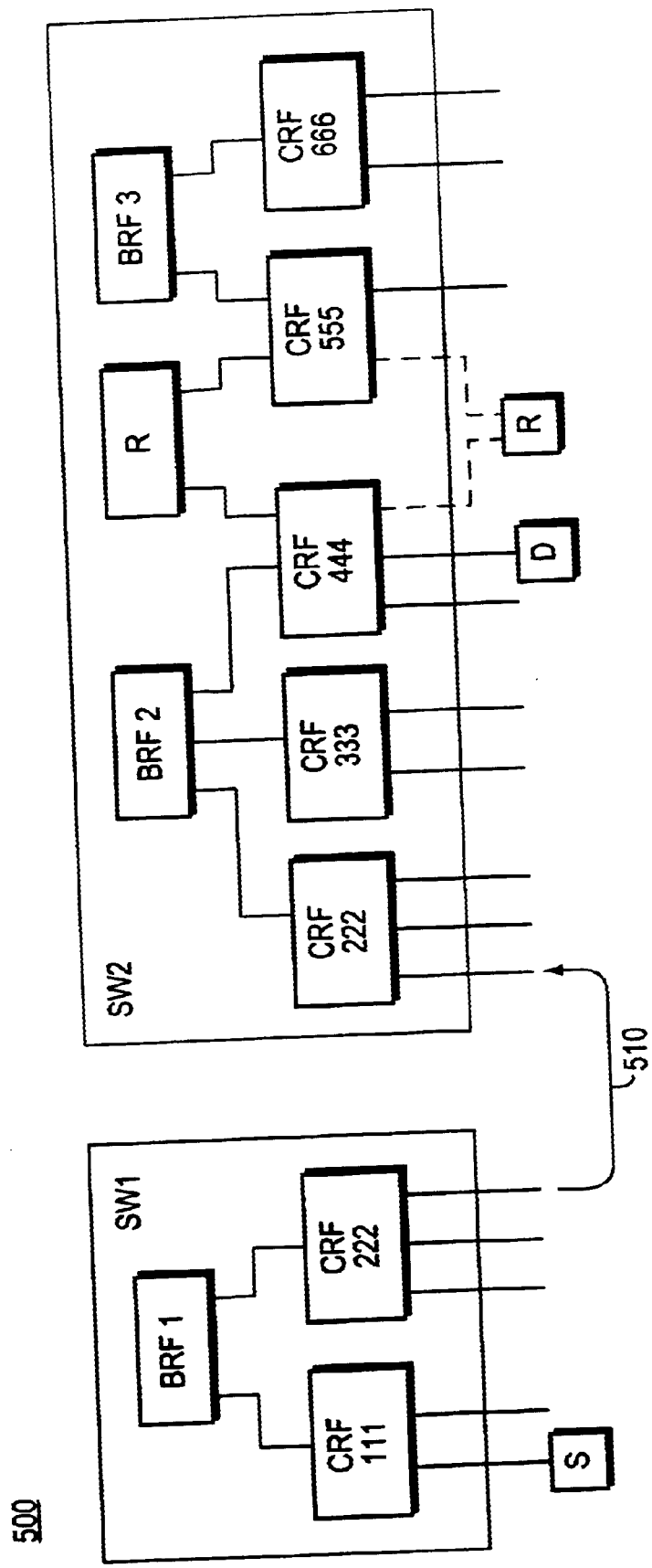
FIG. 5 is a schematic block diagram a conventional bridging arrangement comprising a plurality of switches with a plurality of BRFs, each of which is coupled to a plurality of CRFs.
Figure 6:
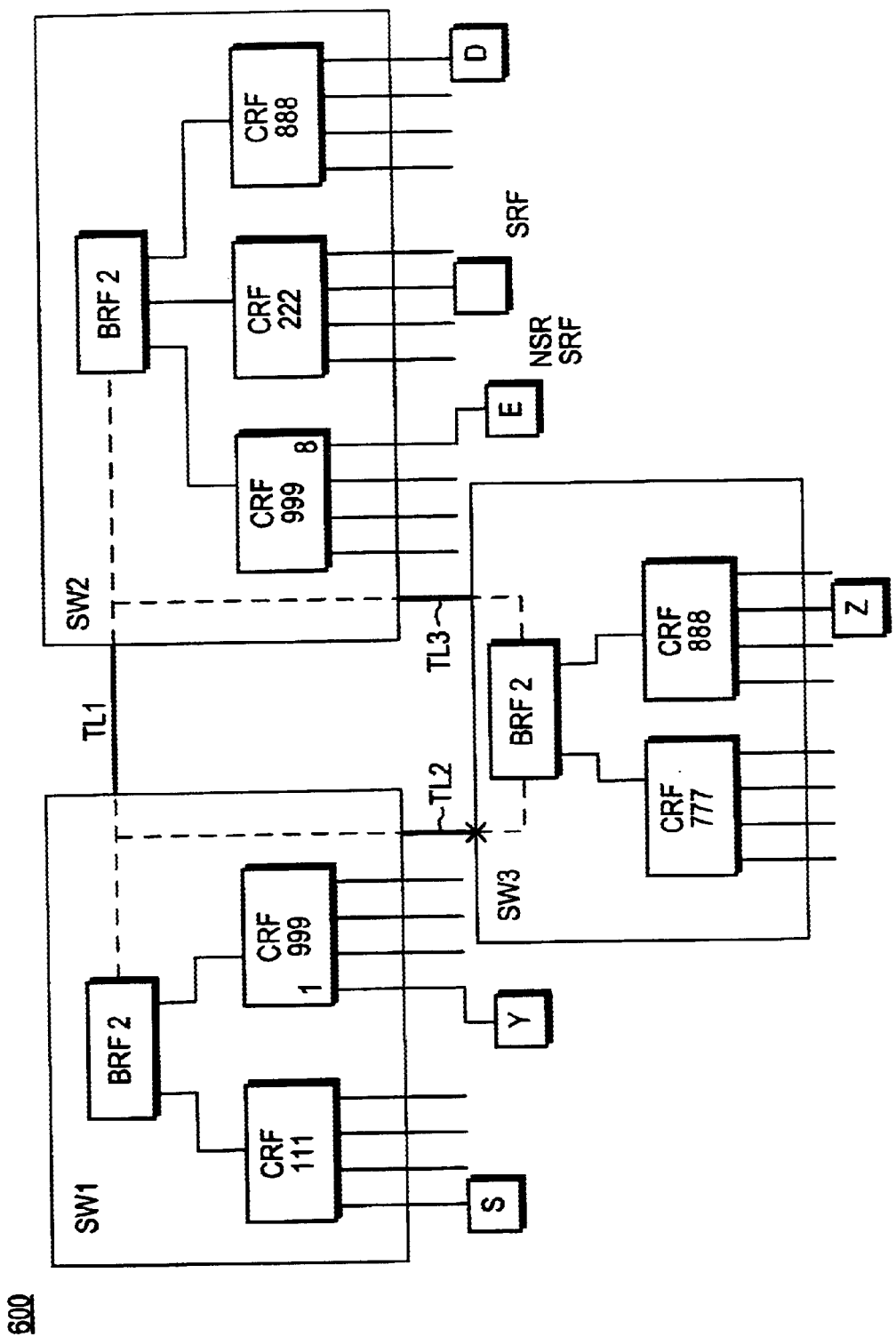
FIG. 6 is a schematic diagram of a TR bridge distributed in a switched fabric according to the invention.

FIG. 6 is a schematic diagram of a token ring (TR) bridge distributed in a switched fabric. The distributed TR bridge 600 includes three TR switches SW1–3, each having a Bridge Relay Function (BRF) logically coupled to a plurality of Concentrator Relay Functions (CRFs); moreover, each CRF has TR ports associated therewith. The physical relationship between ports and bridges in a conventional bridging environment is effectively transformed into a logical relationship between CRFs and BRFs in the distributed TR switching environment. An example of a distributed TR bridge that may be advantageously used with the present invention is described in copending and commonly assigned U.S. patent application Ser. No. (112025-103), titled Token Ring Bridge Distributed in a Switched Fabric by Carson Stuart et al, which application is incorporated by reference as though fully set forth herein.

Specifically, the BRF function (denoted BRF2) is logically distributed across switches SW1–3 so as to create a single BRF distributed switchfabric that spans a plurality of (e.g., three) physically distinct locations. Instead of having a non-disperse BRF in each switch (as described in Annex K), the function of a particular BRF is extended among multiple switches in a distributed manner. The distributed BRF environment may be further extended to include a distributed CRF arrangement. Although there may be multiple physical rings coupled to a CRF, the CRF defines a single ring number (RN) and the multiple physical rings are logically associated as a single ring. Thus, a CRF (e.g., CRF999) contained within a switch (e.g., SW1) may be distributed among at least one other switch (e.g., SW2). Physical token rings are coupled to each CRF such that only end stations (users) need be associated with each ring.

Figure 7:
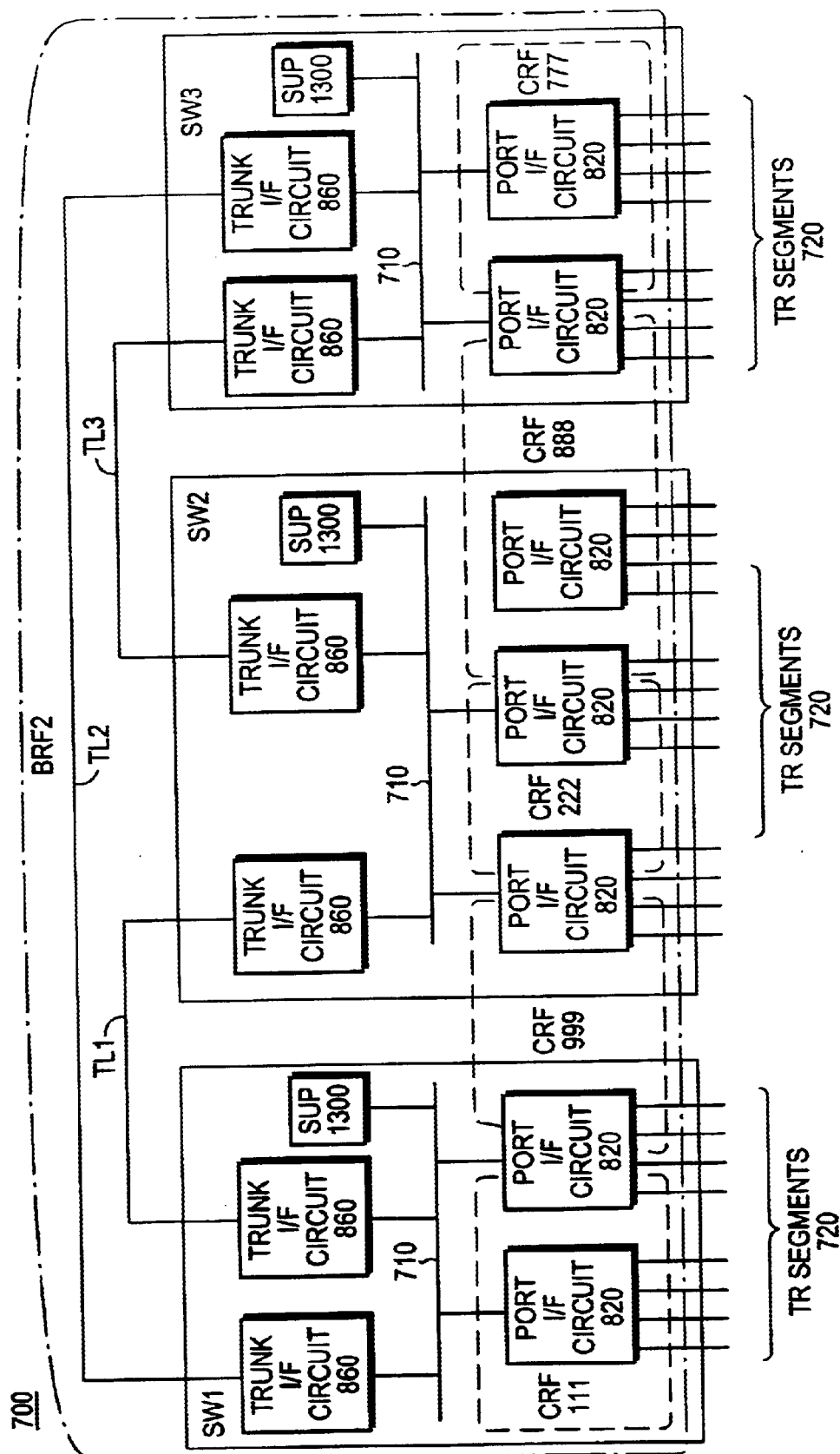
FIG. 7 is a schematic block diagram of an illustrative embodiment of a network switch platform having a plurality of switches configured as a distributed TR bridge in accordance with the present invention.

FIG. 7 is a schematic block diagram of an illustrative embodiment of a network switch platform configured as a distributed TR bridge 700. The distributed bridge platform comprises three switches SW1–3, each including port interface (I/F) circuitry 820, trunk interface (I/F) circuitry 860 and a supervisor (SUP) module 1300 interconnected by a bus 710. The port interface circuitry 820 includes a plurality of TR ports that interconnect a plurality of TR media segments 720, whereas the trunk interface circuitry 860 are interconnected by trunk links TL1–3. The distributed bridge further comprises BRF/CRF constructs "overlayed" onto the platform circuitry to create a logically-defined relationship among the ports and CRFs, and among the switches and distributed BRF.

The port interface circuits are organized and defined as CRF111, 999, 222, 888 and 777, whereas the interconnected port and trunk interface circuits are organized and defined as a BRF that is distributed among the switches SW1–3 to create a single logical switch fabric. The trunk links may comprise any type of physical link configured as a local area network (LAN) or wide area network (WAN) link. An example of a trunk link that may be used with the present invention is an Interswitch Link (ISL) trunk link described in commonly-assigned U.S. patent application Ser. No. (112025-105), titled Switched Token Ring over ISL (TR-ISL) Network, by Carson Stuart et al, which application is incorporated by reference as though fully set forth herein.

Source route bridging (SRB) and/or source route transparent bridging (SRT) operations are supported between physical token rings of the distributed bridge environment. Any BRF or CRF, including the physical token rings coupled to the CRF, may be located in any switch coupled to the distributed bridge. When configuring the distributed bridge, the BRF bridge number (BN) within each switch is initially defined and the CRF RNs associated with the BRF are defined. From a configuration point of view, ports are associated with a CRF and CRFs are associated with a BRF. For example, rings/ports coupled to CRF222 may be physically coupled to SW2, yet may be also logically associated with SW1,3. This configuration information is provided to all of the BRFs associated with the distributed TR bridge.

Distributing a BRF function among different switches requires "knowledge" on behalf of the BRF of those CRFs that are associated with the bridging function, yet that reside on the different switches. For example, BRF2 on SW1 must be aware that it is logically associated with CRF222 on SW2 and BRF2 on SW2 must be aware that it is logically associated with CR111 on SW1. Typically, a conventional bridge acquires such knowledge through configuration management capabilities that provide configuration information such as the bridge number of the bridge, the bridging type of the bridge, the ring numbers associated with the bridge and the medium access control (MAC) address of the bridge. Likewise, configuration information such as the BRF number, bridging type of the BRF, MAC address of the BRF and CRF numbers associated with the BRF need to be provided to the components of the distributed TR bridge. Such configuration information is contained in data structures such as, e.g., modified forwarding tables.

Figure 8:
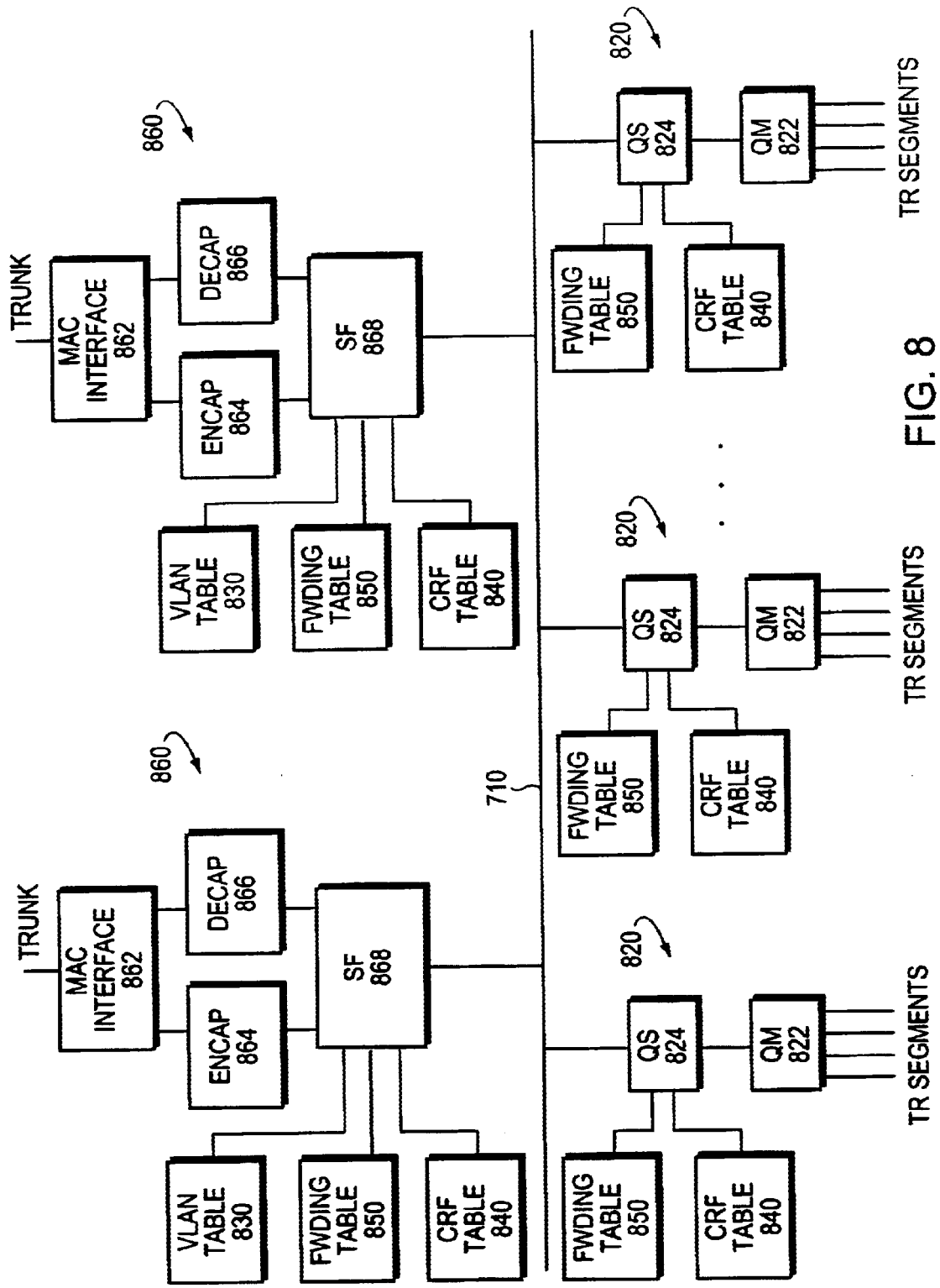
FIG. 8 is a schematic block diagram of trunk and port interface circuitry contained within each switch of the distributed TR bridge.

FIG. 8 is a schematic block diagram of the port interface circuitry 820 and trunk interface circuitry 860 of each switch. In the illustrative embodiment, the port interface circuitry 820 of a CRF is coupled to a modified forwarding table 850 and a CRF table 840, whereas the trunk interface circuitry 860 of a BRF is coupled to a virtual local area network (VLAN) table 830, in addition to the modified forwarding table 850 and CRF table 840. The trunk interface circuitry 860 comprises a MAC interface circuit 862 coupled to a switch fabric interface (SF) device 868 by way of trunk encapsulation (ENCAP) and decapsulation (DECAP) circuits 864 and 866. These latter circuits encapsulate/decapsulate frames with information that is forwarded over/received from the trunks. The MAC interface 862 provides an IEEE 802.x service layer for moving frames to and from the trunking links, whereas the SF device 868 is configured to perform data buffering and frame manipulation, as well as filtering, look-up and forwarding decision operations using the tables.

The port interface circuitry 820 comprises a Quad medium access control (QM) device 822 and a Quad Switch fabric interface (QS) device 824, the latter of which is coupled to the modified forwarding table 850 and the CRF table 840. Each QS device 824 preferably services four (4) ports via a QM device 822. The QM 822 comprises MAC circuitry that preferably provides an IEEE 802.5 service layer for moving the frames to and from the TR segments; more specifically, the MAC capability allows attachment of the switch to a network entity, such as a processor or similar circuit that interfaces with LAN medium connections. The QS 824 is preferably a multi-port switching device configured to perform data buffering and frame manipulation, as well as filtering, look-up and forwarding decision operations using the tables. Accordingly, the forwarding decision circuitry embodied in the QS and SF devices is actually distributed and, thus, collectively these circuits provide the "intelligence" for switching and bridging frames throughout the TR bridge in a distributed switching processing arrangement.

Each CRF and BRF of the distributed TR bridge is assigned an individual VLAN in a "2-tier" arrangement. That is, each CRF is assigned a VLAN identification (ID) and the logically-coupled BRF is assigned its own overlapping/encompassing VLAN ID. The VLAN table 830 is used by the trunk interface circuitry to acquire information (such as CRF VLAN IDs) pertaining to TR frames flowing through the circuitry. The port and trunk interface circuitry process an incoming frame by, inter alia, performing look-up operations into the CRF and modified forwarding tables to enable rendering of a forwarding/switching decision over the distributed bridge. Examples of VLAN, CRF and modified forwarding tables that may be advantageously used with the present invention are described in the Token Ring Bridge Distributed in a Switched Fabric patent application (112025-103) incorporated herein. Although the modified forwarding table 850 and CRF table 840 are shown as shared among the four QS/QM ports, these tables may be distributed in a manner such that there is only one modified forwarding table and one CRF table (along with one VLAN table) per switch.

Figure 9:
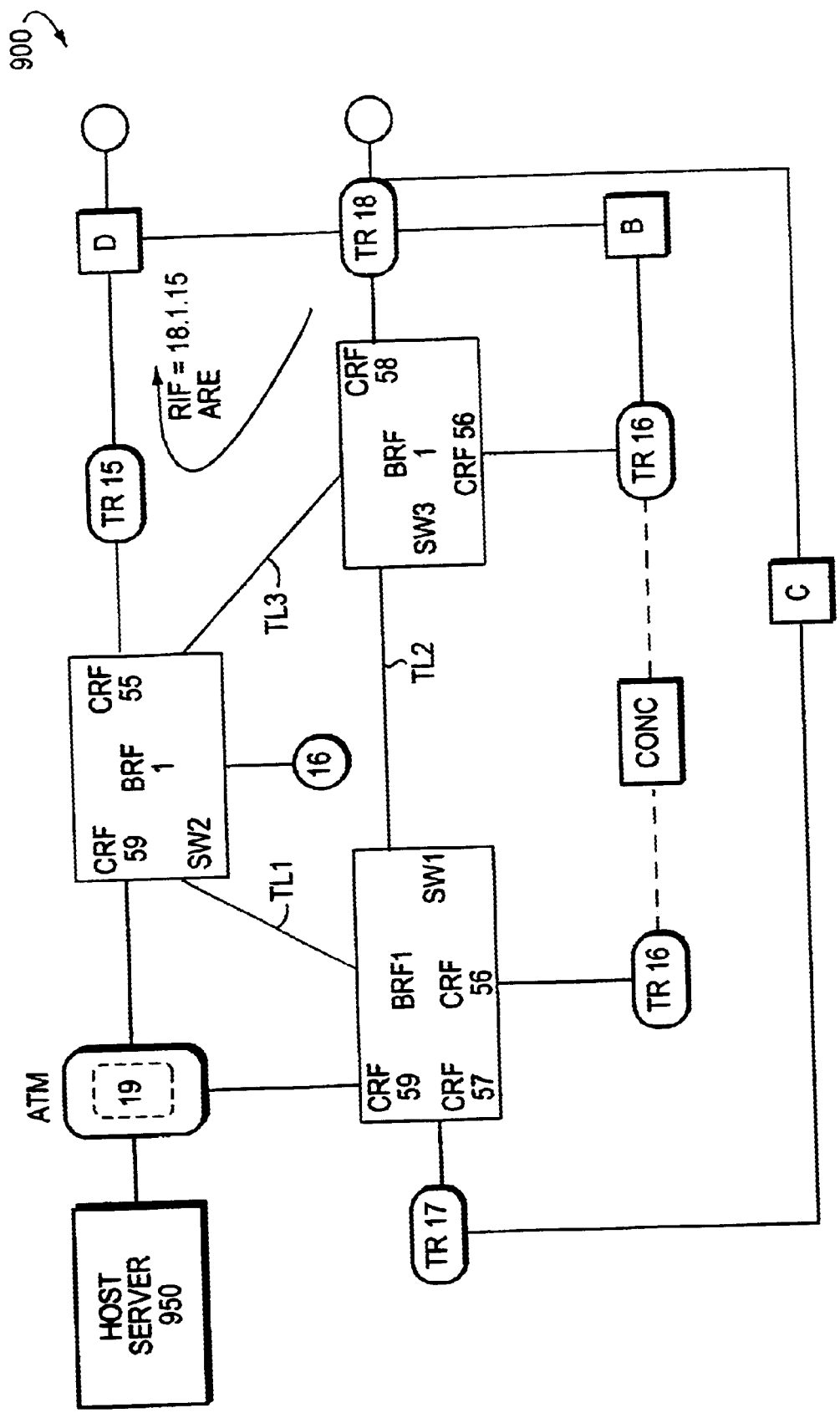
FIG. 9 is a schematic diagram of an embodiment of the distributed TR bridge that may be advantageously used with the present invention.

FIG. 9 is a schematic diagram of an embodiment of the distributed TR bridge 900 that may be advantageously used with the present invention. The distributed TR bridge comprises three physical switches (SW1–SW3) interconnected by trunking links, such as (TR) ISL links TL1–3, to form an ISL switched network cloud. A BRF function (BRF1) is distributed among the switches; in addition, a CRF function is distributed in the bridge as denoted by TR16 being coupled to SW1 and SW3, and further being interconnected by a concentrator (Conc) function. The distributed functions interact with the ISL-connected switches to provide an ISL switching fabric that may be advantageously used with the present invention.

Specifically, the invention pertains to a Distributed Ring Protocol (DRiP) arrangement that includes a database and protocol which cooperate to limit ARE frames coming into each switch of the network cloud, as well as control (and allow under certain circumstances) the formation of a virtual CRF loop created by the (TR) ISL links of the distributed bridge environment. DRiP denotes a protocol that is directed to rings/CRFs and their status, wherein the rings/CRFs are preferably indexed in the DRiP database by VLAN ID. As described further herein, the DRiP database includes VLAN IDs that map to ring number/CRFs along with indications as to whether the VLAN IDs are active or configured.

Figure 10:
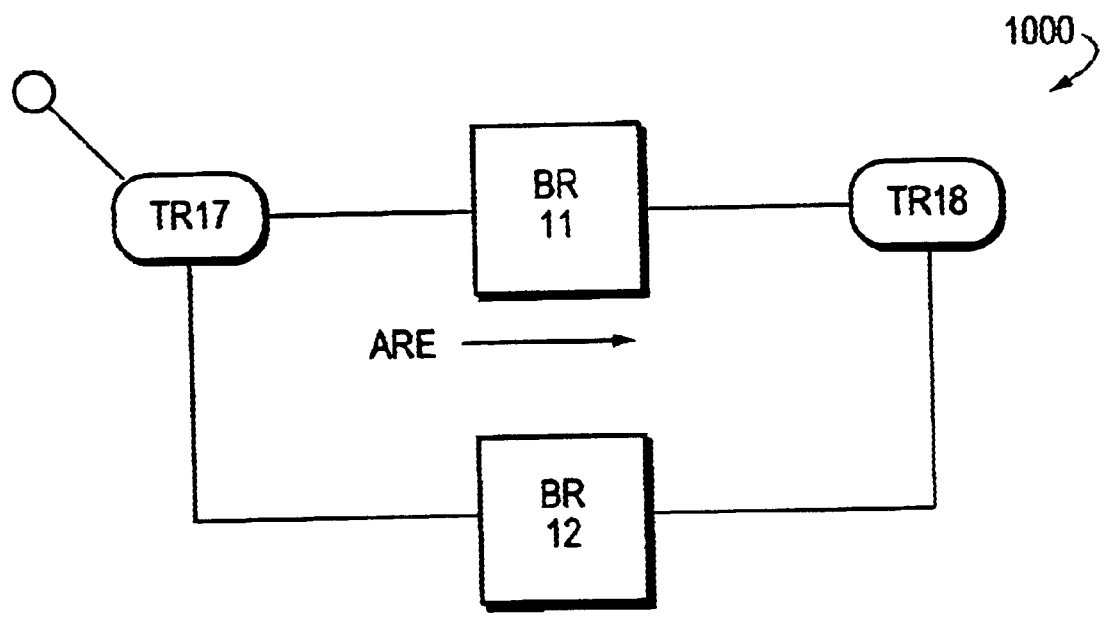
FIG. 10 is a schematic block diagram of a conventional computer network having a plurality of interconnected bridges.

An example of limiting ARE frames (i.e., ARE reduction) is illustrated in FIG. 10, which is a schematic block diagram of a conventional computer network having a plurality of interconnected bridges. Assume an ARE frame is transmitted over TR17 and passes through BR11 to TR18; the contents of the RIF in the ARE frame are thus <17.11.18>. If the ARE frame is then passed from TR18 to BR12, that bridge scans the RIF and, upon detecting TR17 in the RIF, discards the ARE frame because it has already traversed TR17. As noted, a properly functioning bridge does not forward a copy of an ARE frame back over a token ring from which it has already traversed.

Refer again to the distributed TR bridge of FIG. 9 and, in particular, to an externally-looped network comprising TR18, SW3, SW2, TR15 and external bridge D. An ARE frame that is transmitted over TR18 and that passes through BRF1 (SW3) to BRF1 (SW2) via TL3 and then onto TR15 has a RIF of <18.1.15> when received at bridge D. Bridge D then proceeds to reduce the ARE frame by preventing it from traversing TR18. Specifically, bridge D scans the RIF of the ARE frame and, upon recognizing that it has already passed over TR18, discards the ARE frame. However, the ARE frame may take an alternative path that creates a loop with, e.g., TR18 and, because of the meshed network of switches created by the distributed TR bridge, the frame may be placed back on TR18 even though it had already traversed that ring.

ARE reduction is defined as an option in IEEE 802.1D that allows a bridge to eliminate undesirable paths to a destination that would result in multiple copies of an ARE frame being delivered to that destination. For instance, an ARE frame originating on TR18 may take one path through BRF1 of SW3 with a resulting RIF of <18.1> or it may take another path through bridge B, TR16 and BRF1 (SW3) with a resulting RIF of <18.8.16.1>. Although each of these frames are "unique" (not copies), the ARE frame following the longer path has a RIF that contains the same ring in the RIF of the frame following the shorter, more direct route. Since BRF1 (SW3) is coupled to both TR16 and TR18, that switch realizes that it had already seen the ARE frame following the shorter path and, as a result, discards the ARE frame with the longer RIF. Thus ARE reduction reduces traffic in a network.

The example above illustrates ARE reduction within a single physical switch SW3. Another bridge C interconnects TR18 to TR17 which, in turn, is coupled to BRF1; yet this latter distributed BRF is located in a physical switch (SW1) that is different than the switch (SW3) containing BRF1 coupled to TR18. An ARE frame that is "launched" onto TR18 and forwarded over bridge C to TR17 is received by BRF1 (SW1), which scans the RIF of the frame and realizes, via the DRiP database and protocol, that TR18 is logically coupled to its BRF function. That is, the novel arrangement informs BRF1 in SW1 about the status (active and/or configured) of end stations on SW3 coupled to TR18.

According to an aspect of the invention, the DRiP protocol is used to detect and enforce topology configurations within the distributed bridge network. When a switch is initially "brought-up", VLANs are not configured although it is desirable to have ports active on the CRFs of the switch. Therefore, a default BRF and a default CRF are provided as an initial configuration that allows a switch to "come up" and, more particularly, allows ports to insert into the distributed bridge before any configuration information is exchanged among its switches. In the illustrative embodiment described herein, the default configuration for a BRF is BRF1005 and for a CRF is CRF1003.

In the case of a token ring LAN emulation (TrLane) proxy client, an ATMLane network may function as a CRF from the perspective of the distributed switch of the ISL-connected cloud. For example, if SW1 is the active connection into an ATMLane network (ATM19), then CRF59 within BRF1 (SW1) functions as a "proxy client" for the ISL-connected cloud to a host server 950 when the client attempts to connect to the server. Here, CRF59 uses its DRiP database to determine whether a TR, e.g., TR18, is configured and/or active; if that ring is active, the proxy client can transmit the message to the server.

According to another aspect of the present invention, the DRiP database is dynamically constructed and maintained in each switch of the ISL switching fabric, and comprises ring numbers and active ports within the switched network cloud bounded by the span of the ISL-connected mesh network of switches. Each DRiP database in each switch of the distributed bridge is configured consistently; e.g., a particular VLAN ID maps to a particular CRF in each database. In another aspect of the invention, the DRiP protocol distributes the information contained in the DRiP database within the switched network cloud. Specifically, the DRiP protocol is used to create the database by exchanging information among the switches relating to the active status of VLANs associated with their CRFs. Each switch in the ISL-connected cloud shares a VLAN configuration; the DRiP protocol provides a real-time status of those VLANs and their associated CRFs. There is an entry in the database for each VLAN ID (e.g., a total of 1024 VLAN IDs) within the switched ISL network that has a port assignment and status is collected based on protocol message exchanges among the switches to determine whether these VLAN IDs are active or inactive, and configured or not configured.

The DRiP protocol thus defines a communication message exchange between switches of a distributed TR bridge, wherein the messages are exchanged both periodically and when there is a change in status of any VLAN ID. These periodic and specifically-issued message exchanges ensure coherency of the DRiP databases maintained by the switches. Broadly stated, each switch distributes the status of VLANs associated with its local CRFs in a defined manner according to the protocol. For example, SW2 distributes advertisements/updates pertaining to the VLAN IDs associated with CRF59 and 55, but not advertisements pertaining to VLAN IDs associated with CRF56 and 58 (which are contained in SW3).

According to the invention, there are two categories of advertisements associated with the DRiP protocol. A first category involves CRF ports that have no activity and have no end stations or bridges coupled to their physical rings. The DRiP protocol adIs vertises these ports as configured. A second category involves CRF ports that have active end stations coupled and inserted to their physical rings; the DRiP protocol advertises these ports as configured and active. A CRF port that "inserts" into a token ring provides a configured and active port status to the DRiP database. A port that does not insert into a ring may have a configured (as opposed to active) status. A configured state is significant in the event a primary path goes down and an alternate path is necessary for communication within the distributed bridge. An example of an arrangement that may be used with the present invention is described in commonly-assigned U.S. patent application Ser. No. (112025-104), titled Backup CRF VLAN, by David Carroll et al, which application is incorporated by reference as though fully set forth herein. In addition, the configured state may be used when detecting illegal configurations of VLANs on multiple switches of the distributed switch fabric. These advertisements are also useful with respect to detecting invalid configurations pertaining to VLAN IDs associated with CRFs and, as noted, for ARE reduction.

Figure 11:
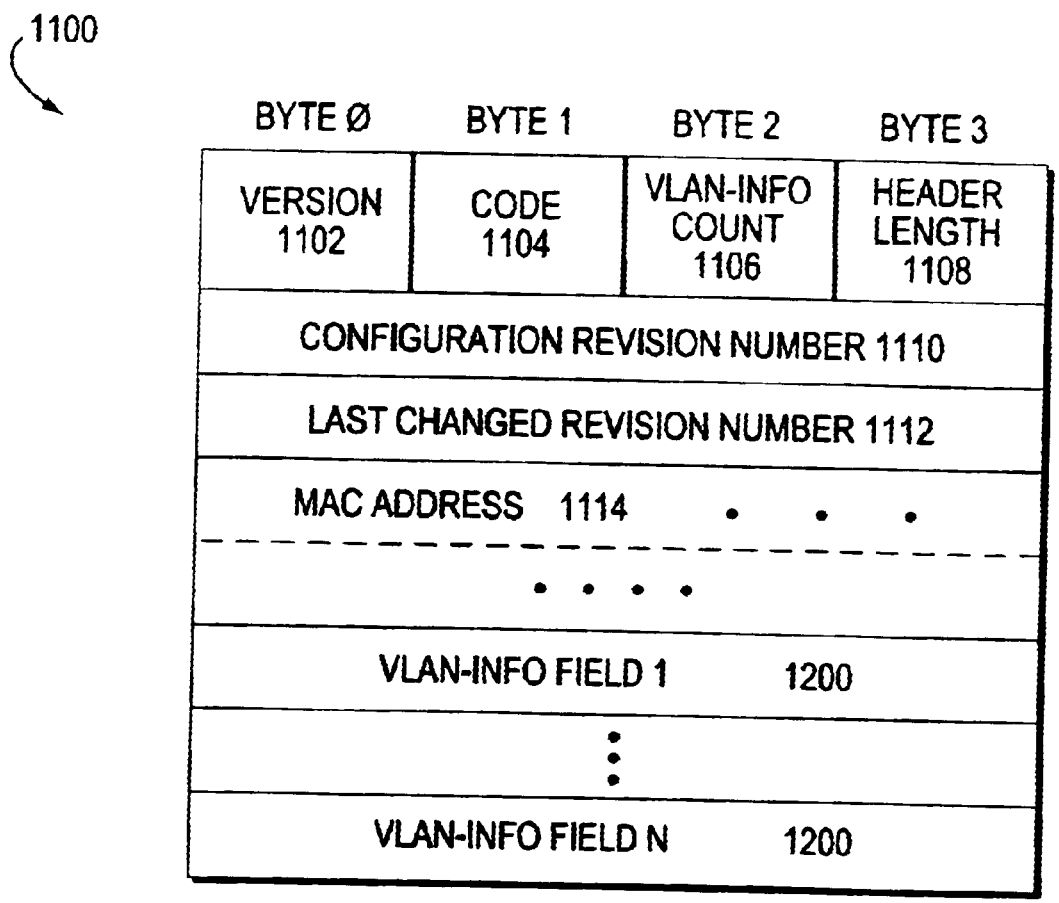
FIG. 11 is a schematic block diagram illustrating the format of a DRiP advertisement message in accordance with the present invention.

FIG. 11 is a schematic block diagram illustrating the format of a DRiP advertisement message 1100. A version field 1102 contains a version number of the message and the contents of a code field 1104 specify the type of message (e.g., periodicallyexchanged or specifically-issued advertisement message). A VLAN-info count field 1106 contains the number of VLANs advertised in the message. Advertisements occur on a per-switch basis so that, in the case of SW1, the advertisement message advertises VLANs associated with, e.g., CRF56, CRF57, CRF59 and CRF1003. A header length field 1108 contains the number of bytes of header for the particular type of advertisement. The header is typically 20 bytes in length and extends from the version field 1102 to the first byte of a first VLAN-Info field 1200 (including the Reserved field).

A configuration revision number field 1110 contains a sequence number used to determine whether a particular advertisement has been seen by the switches of the ISL switching fabric. A last changed revision number field 1112 contains the last revision number of a change associated with an originating MAC address. For example, if a particular switch missed a change revision advertisement message (as opposed to a periodic advertisement), the last changed revision number informs that switch it needs to update its database. The next field is a MAC address field 1114 which contains the MAC address of the switch sending the DRiP advertisement 1100. The field 1114 is used to identify the originator of the DRiP Advertisement message; accordingly, the contents of this field need not be an actual MAC address, but may comprise any identifies that uniquely identifies the switch within the network.

The remaining fields of the DRiP advertisement message are VLAN-Info fields 1200 (1–N). There is a VLAN-Info field for each active or configured CRF on a switch. The advertisement only contains local information and, as such, no switch may initiate an advertisement for any CRF that is not "local" to it (within the switch). If a CRF VLAN ID is not contained in an advertisement, then the CRF is considered no longer configured or active and is deleted from the DRiP database. An advertisement (periodic and changed) contains all CRF information for the switch generating the advertisement.

Figure 12:
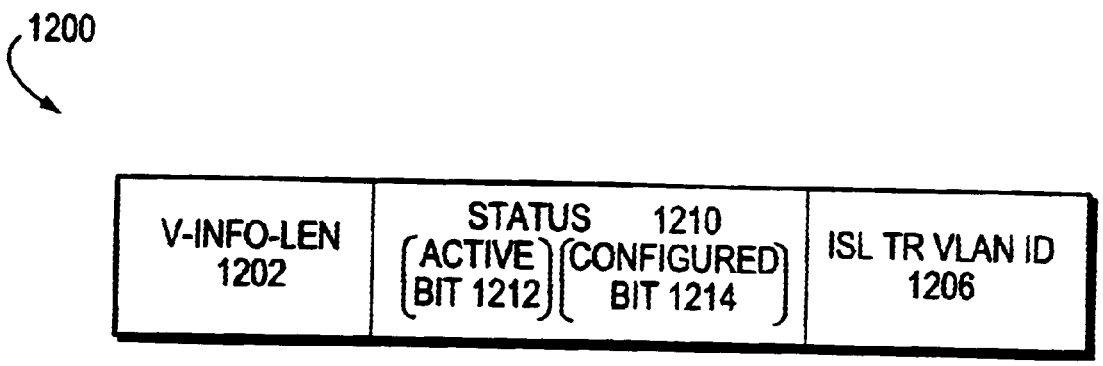
FIG. 12 is a schematic diagram of the format of a virtual local area network information field contained in the DRiP advertisement message of FIG. 11.

FIG. 12 is a schematic diagram of the VLAN-Info field 1200 containing a V-Infolength subfield 1202 whose contents specify the length (in bytes) of the VLAN-Info field (including this subfield). The contents of a status subfield 1210 specify the status of the CRF as having an active port or as having no active ports, but configured ports. There are two notable bits within the status subfield 1210: an active bit 1212 and a configured bit 1214. Assertion of the configured bit 1214 indicates that a port has been assigned to a particular VLAN ID on the switch, while assertion of the active bit 1212 indicates that an endstation is inserted on that (active) port and ARE reduction can be performed on the active port. The last subfield in the VLAN-Info field 1200 is an ISL TR VLAN ID sub-field 1206 that contains a VLAN ID (out of a maximum 1024 VLAN IDs) of the CRF.

As noted, the advertisement message 1100 is used for both periodic and changed message exchanges among the ISL-connected switches of the distributed bridge 900. The DRiP database is maintained by, and the protocol is administered by, DRiP software implemented on each switch of the distributed bridge and stored on a memory 1320 of a suiss pervisor module such as, e.g., SUP module 1300 (FIG. 7).

Figure 13:
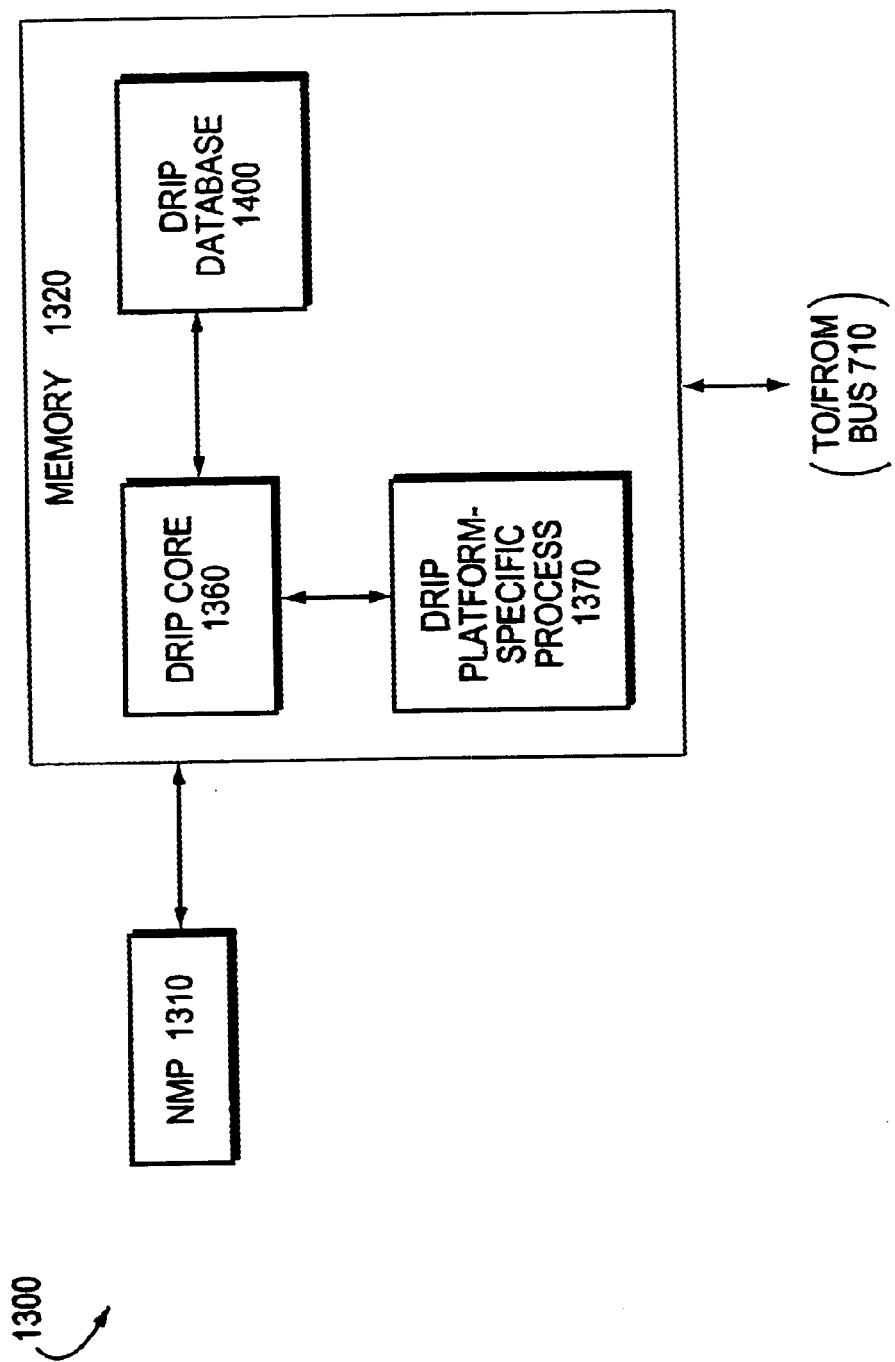
FIG. 13 is a schematic diagram of a network management processor module that includes novel DRiP software elements in accordance with the present invention.

FIG. 13 is a schematic diagram of the SUP module 1300 including a DRiP database 1400 and DRiP software executing on a processing element configured as, e.g., a network management processor (NMP) 1310. The DRiP software comprises two main elements: a DRiP core element 1360 and a DRiP platform-specific element 1370, each of which is an application program executing on the NMP 1310. Advertisement messages directed to the core element are "queued" by the platform-specific process prior to being relayed to the DRiP core element for processing.

The DRiP core process 1360 is responsible for constructing and maintaining the DRiP database 1400, and determining whether there are any conflicts with VLAN IDs distributed throughout the bridge 900. The DRiP core 1360 generates and receives advertisements, the latter from other switches in the distributed fabric and from its own switch when local configuration changes occur within the switch. Upon detecting these changes, the core process instructs the platform-specific process 1370 to notify the appropriate functions within the platform about the changes. The DRiP core may be ported to multiple different platforms, whereas the platform-specific process is configured to run on the specific platform to address issues such as advertisement message handling and specific-function notification within the platform. For example, if there is a need for system level service, such as transmitting an advertisement 1100, the core process 1360 makes a function call to the service function defined in the platform-specific process 1370, which then calls the associated routines in an operating system of the platform.

FIG. 14 is a schematic diagram of the organization of an illustrative embodiment of the DRiP database 1400 having a plurality entries, each of which contains a plurality of bits. Each entry of the DRiP database 1400 is assigned on a per VLAN basis. The DRiP database preferably functions as a state machine wherein certain actions are specified based on the states of these bits. Specifically, the bits include a backup (B) bit and a shared (S) bit. The B bit relates to a backup CRF function, whereas the S bit informs the DRiP software that a particular VLAN may be shared and/or distributed among multiple switches. In the illustrative embodiment described herein, only CRF 1003 may be distributed. The bits of the database further include a local active (LA) bit, a local configured (LC) bit, a remote active (RA) bit and a remote configured (RC) bit. Also, there are two reserve bits denoted X.

The following example illustrates creation of the DRiP database to enable ARE reduction and to ensure that a logically distributed CRF is not allowed on CRF/VLANs that do not have a shared bit asserted. Assume that the DRiP database 1400 is located in SW1 and has an entry 57 for CRF/VLAN 57. The CRF associated with VLAN57 is not a backup CRF, so the state of the B bit is 0. Furthermore, this particular entry is not shared, so the S bit is 0. The backup state is defined in another database (e.g., a VTP database) and is merely reflected in the DRiP database 1400. The CRF/VLAN 57 entry has a port that is locally active, so the LA bit is asserted. This entry also has a locally configured port so the LC bit asserted. The next two remote bits (RA and RC) are passed in the advertisement message; bits RA and RC reflect the status of a (remote) switch other than the local switch. CRF/VLAN 57 is local to SW1 and SW1 has not received any advertisements pertaining to CRF/VLAN 57 from any remote switch; ac RC are 0 for entry 57.

The DRiP database is "updated" between non-adjacent switches (e.g., SW1-SW2-SW3) through the passing of advertisement messages among the switches. Specifically, each switch relays an incoming DRiP advertisement to all trunk links that the advertisement has not traveled over; the switch determines which trunks should receive the message by examining the sequence number contained in the configuration revision number field 1110 to determine whether those switches that have seen the advertisement. For example, SW3 receives database updates from SW1 via a relay of an advertisement over trunk link TL1 to SW2 and over TL3 to SW3.

Referring also to FIG. 9, assume TR15 does not have any active stations coupled to it and SW2 advertises its CRF/VLAN entry 55 as having a configured port status and, at least initially, having no active port. In the DRiP database 1400 (SW1), the states of the bits B, S, LA, LC for the entry CRF/VLAN 55 are zero. However, entry 55 has a port remotely configured (from the perspective of SW1) but not active; accordingly, RC is asserted and, at least initially, RA is zero. Later, if an advertisement is sent by SW2 indicating that the CRF55 has an active port, the state of the RA bit is changed to asserted (note that this transition is indicated as "0/1" for bit RA). The states of the RA and RC bits inform the ports within SW1 that there is an active path through CRF55 to TR15. Note also that transitions of the bits in the database may result in an action being taken by the switch. In the case of the CRF/VLAN entry 1003, that CRF is allowed to be shared in the distributed bridge and no action is taken because both the local and remote ports are active and configured.

The following in an example of the ARE reduction function. Assume that the port to TR18 (SW3) is initially inactive. In the DRiP database 1400 (SW1), the states of the bits LA, RA and RC for the entry CRF/VLAN 58 are zero. Therefore, an ARE frame traversing the path TR18, bridge C and TRl7 to SW1 contains RN18 in its RIF. When SW1 scans the RIF of the ARE frame, it "looks-up" RN18 (CRF58) in its DRiP database, determines that there are no active ports on the distributed BRF1 for this CRF and, thus, forwards the ARE frame to BRF1.

Subsequently when the port to TR18 on SW3 becomes active, SW3 detects this transition, updates (e.g., asserts) the LA bit of the appropriate entry on its DRiP database and transmits a DRiP advertisement message over its trunk interfaces to the other switches indicating that CRF58 is active and configured. Upon receiving the message, SW1 asserts the RA and RC bits in its DRiP database for entry CRF58 (note that this transition is indicated as "0/1" for bits RA and RC). It should be noted that this process is used to update the DRiP database on all switches of the distributed switching fabric. Thereafter when it receives another ARE frame along the same path indicated above, SW1 scans the RIF of the frame and looks-up RN18 (CRF58) in its DRiP database. This time, however, the RA bit is active indicating that the ARE frame already has a shorter path to the BRF1 (via SW3); accordingly, SW1 does not forward the frame throughout the BRF1. Note that SW1 may still forward the ARE frame to other ports on CRF57.

An invalid configuration arises when a CRF has ports assigned to more than one switch; this is shown in FIG. 9 with CRF56 on switches SW1 and SW3. Assume there are no ports currently assigned to either SW1 or SW3 and that VLAN CRF56 is not owned by any switch in the fabric. A user then assigns a port to CRF56 on SW1. SW1 imme. diately sends an advertisement message over all trunk links, e.g., TL1 and TL2. The LC bit for CRF56 is asserted in the advertisement and, in response to receiving and processing the message, SW2 and SW3 update their DRiP databases. In particular, the RC bits of the CRF56 entries in these databases are marked as owned by SW1.

Thereafter, the user attempts to assign a port to CRF56 on SW3. Prior to assigning the port, the DRiP database is checked to see whether any other switch owns CRF56. Since SW1 owns that CRF, the port cannot be further assigned and the user is informed that such a port assignment is not allowed.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for maintaining and distributing information within a distributed token ring (TR) bridge having a logical switch fabric that is distributed over a TR switching network of switches interconnected by trunk links, the system comprising:
   a database contained within each switch of the switch fabric, the database including virtual local area network (VLAN) identifiers (IDs) that map to ring numbers and their associated ports within each switch, the database further including indications as to status of the ports mapped to the VLAN IDs; and
   a protocol for distributing the information contained in the database among the switches of the fabric, the protocol defining a communication exchange of messages between the switches, wherein the messages comprise periodically-exchanged messages and specifically-issued messages, the specifically-issued messages being exchanged when there is a change in status of any VLAN ID.

2. The system of claim 1 wherein the periodic and specifically-issued message exchanges enable creation of the database within each switch and further ensure coherency of the databases maintained by the switches.

3. The system of claim 2 wherein the ring numbers pertain to Concentrator Relay Functions (CRFs) and their associated ports of the fabric, the ports coupled to physical token rings adapted to attach to end stations and bridges, and wherein the trunk links are interswitch link (ISL) trunk 1.

4. The system of claim 3 wherein the database and protocol cooperate to provide a distributed ring protocol (DRiP) arrangement that limits all routes explorer (ARE) frames received at each switch of the switch fabric, as well as control formation of a virtual CRF loop created by the ISL links of the network.

5. The system of claim 4 wherein the periodically-exchanged and specifically-issued messages comprise advertisement messages and wherein the protocol comprises a plurality of categories of advertisement messages distributed by each switch to advertise the status of VLAN IDs associated with the CRFs.

6. The system of claim 5 wherein one of the plurality of categories of advertisement messages is a configured category pertaining to CRF ports that have no end stations or bridges inserted into their physical rings.

7. The system of claim 6 wherein another of the plurality of categories of advertisement messages is a configured and active category pertaining to CRF ports that have active end stations or bridges inserted into their physical rings.

8. The system of claim 7 wherein each advertisement message comprises:
   a version field containing a version number of the message;
   a code field having contents that specify a type of message, such as periodically-exchanged or specifically-issued;
   a VLAN-info count field containing a number of VLANs advertised in the message; and
   a header length field containing a number of bytes of header for the type of message.

9. The system of claim 8 wherein each advertisement message further comprises:
   a configuration revision number field containing a sequence number for determining whether an advertisement message has been received by the switches of the logical switch fabric;
   a last changed revision number field containing a last revision number of a change associated with an originating medium access control (MAC) address; and
   a MAC address field containing an identifier of the switch sending the advertisement message.

10. The system of claim 9 wherein the identifier of the MAC address field comprises an identifier that uniquely identifies an originator of the advertisement message.

11. The system of claim 10 wherein the identifier comprises a MAC address of the originator of the advertisement message.

12. The system of claim 9 wherein each advertisement message further comprises a VLAN-info field for each active or configured CRF on a switch.

13. The system of claim 12 wherein the VLAN-info field comprises:
   a V-info-length subfield having contents that specify a length of the VLAN-info field;
   a status subfield having contents that specify a status of the CRF as having an active port or as having no active ports, but configured ports; and
   an ISL TR VLAN ID subfield that contains a VLAN ID of the CRF.

14. The system of claim 13 wherein the status subfield comprises:
   a configured bit adapted to indicate that a port has been assigned to a particular VLAN ID on the switch; and
   an active bit adapted to indicate that an endstation is transmitting on the port and ARE reduction can be performed on the port.

15. The system of claim 7 further comprising:
   a processing element within each switch; and
   software processes executing on the processing element, the software processes comprising (i) a DRiP core element for constructing and maintaining the database utilizing the advertisement messages and (ii) a DRiP platform-specific element configured for advertisement message handling and specific-function notification within each switch.

16. The system of claim 15 wherein the database comprises a plurality entries, each entry assigned on a per VLAN ID basis and indexed by the VLAN ID of a CRF, each entry further containing a plurality of bits comprising:
   a shared bit for informing the software processes that the VLAN ID may be shared and/or distributed among multiple switches;
   a local active bit indicating the active status of a local CRF port having the VLAN ID;
   a local configured bit indicating the configured status of the local CRF port;
   a remote active bit indicating the active status of a remote CRF port having the VLAN ID; and a remote configured bit indicating the configured status of the remote CRF port.

17. The system of claim 16 wherein the remote active and remote configured bits are passed as status bits of a status subfield within the advertisement message.

18. A method for maintaining and distributing information within a distributed token ring (TR) bridge having a logical switch fabric that is distributed over a TR switching network of switches interconnected by trunk links, the method comprising the steps of:

mapping virtual local area network (VLAN) identifiers (IDs) to ring numbers and their associated ports within a database of each switch in the switch fabric;

providing indications in the database as to status of the ports mapped to the VLAN IDs;

distributing the information contained in the database among the switches of the distributed TR bridge using a protocol that defines a communication exchange of messages between the switches, wherein the messages comprise periodically-exchanged messages and specifically-issued messages; and exchanging the specifically-issued messages when there is a change in status of any VLAN ID.

19. The method of claim 18 further comprising the steps of:

creating the database within each switch using the periodic and specifically-issued message exchanges; and ensure coherency of the databases maintained by the switches using the periodic and specifically-issued message exchanges.

20. The method of claim 19 further comprising the step of, wherein the periodically-exchanged and specifically-issued messages comprise advertisement messages:

advertising the status of VLAN IDs associated with Concentrator Relay Functions (CRFs) and their ports of the switch fabric in accordance with a plurality of categories of advertisement messages distributed by each switch.

21. A switch apparatus, comprising:

a database contained within said switch, said database holding data to implement a logical switch fabric over a distributed token ring network of switches, said database including virtual local area network (VLAN) identifiers (IDs) that map to token ring network ring numbers and their associated ports within each switch of said network of switches, the database further including indications as to status of the ports mapped to the VLAN IDs; and a protocol for distributing the information contained in the database among the switches of the fabric, the protocol defining a communication exchange of messages between the switches.

22. The apparatus of claim 21 further comprising:

said messages include periodically-exchanged messages and specifically-issued messages, the specifically-issued messages being exchanged when there is a change in status of any VLAN ID.

23. The apparatus of claim 22 further comprising:

the periodic and specifically-issued message exchanges enable creation of the database within each switch and further ensure coherency of the databases maintained by the switches.

24. The apparatus of claim 21 further comprising:

said ring numbers pertain to Concentrator Relay Functions (CRFs) and their associated ports of the fabric, the ports coupled to physical token rings adapted to attach to endstations and bridges, and wherein the trunk links are interswitch link (ISL) trunk links.

25. The apparatus of claim 21 further comprising:

said database and protocol cooperate to provide a distributed ring protocol (DRiP) arrangement that limits all routes explorer (ARE) frames received at each switch of the switch fabric, as well as control formation of a virtual CRF loop created by interswitch link (ISL) trunk lines of the network.

26. The apparatus of claim 22 further comprising:

said periodically-exchanged and specifically-issued messages include advertisement messages and wherein the protocol includes a plurality of categories of advertisement messages distributed by each switch to advertise the status of VLAN IDs associated with a control formation of a virtual CRF loop created by interswitch link (ISL) trunk lines of the network.

27. The apparatus of claim 26 further comprising:

one of the plurality of categories of advertisement messages is a configured category pertaining to CRF ports that have no endstations or bridges inserted into their physical rings.

28. The apparatus of claim 27 further comprising:

another of the plurality of categories of advertisement messages is a configured and active category pertaining to CRF ports that have active endstations or bridges inserted into their physical rings.

29. The apparatus of claim 26 further comprising:

each advertisement message includes, a version field containing a version number of the message;

a code field having contents that specify a type of message, such as periodically-exchanged or specifically-issued;

a VLAN-info count field containing a number of VLANs advertised in the message; and a header length field containing a number of bytes of header for the type of message.

30. The apparatus of claim 26 further comprising:

each advertisement message includes, a configuration revision number field containing a sequence number for determining whether an advertisement message has been received by the switches of the logical switch fabric;

a last changed revision number field containing a last revision number of a change associated with an originating medium access control (MAC) address; and a MAC address field containing an identifier of the switch sending the advertisement message.

31. The apparatus of claim 30 further comprising:

the identifier of the MAC address field includes an identifier that uniquely identifies an originator of the advertisement message.

32. The apparatus of claim 30 further comprising:

the identifier includes a MAC address of the originator of the advertisement message.

33. The apparatus of claim 30 further comprising:

each advertisement message further includes a VLAN-info field for each active or configured CRF on a switch.

34. The apparatus of claim 33 further comprising:

the VLAN-info field includes, a V-info-length subfield having contents that specify a length of the VLAN-info field;

a status subfield having contents that specify a status of the CRF as having an active port or as having no active ports, but configured ports; and an ISL TR VLAN ID subfield that contains a VLAN ID of the CRF.

35. The apparatus of claim 34 further comprising:

the status subfield includes,
- a configured bit adapted to indicate that a port has been assigned to a particular VLAN ID on the switch; and
- an active bit adapted to indicate that an endstation is transmitting on the port and ARE reduction can be performed on the port.

36. The apparatus of claim 21 further comprising:

a processing element within each switch; and software processes executing on the processing element, the software processes including (i) a DRiP core element for constructing and maintaining the database utilizing an advertisement messages and (ii) a DRiP platform-specific element configured for advertisement message handling and specific-function notification within said switch.

37. The apparatus of claim 21 further comprising:

said database includes a plurality of entries, each entry assigned on a per VLAN ID basis and indexed by the VLAN ID of a CRF, each entry further containing a plurality of bits having,
- a shared bit for informing the software processes that the VLAN ID may be shared and/or distributed among multiple switches;
- a local active bit indicating the active status of a local CRF port having the VLAN ID;
- a local configured bit indicating the configured status of the local CRF port;
- a remote active bit indicating the active status of a remote CRF port having the VLAN ID; and
- a remote configured bit indicating the configured status of the remote CRF port.

38. The apparatus of claim 37 further comprising:

said remote active and remote configured bits are passed as status bits of a status subfield within an advertisement message.

39. A method of operating a switch, comprising:

holding data to implement a logical switch fabric over a distributed token ring network of switches in a database contained within said switch, said database including virtual local area network (VLAN) identifiers (IDs) that ring network ring numbers and their associated ports within each switch of said network of switches, the database further including indications as to status of the ports mapped to the VLAN IDs; and distributing, using a protocol, the information contained in the database among the switches of the fabric, the protocol defining a communication exchange of messages between the switches.

40. The method of claim 39, further comprising:

mapping said virtual local area network (VLAN) identifiers (IDs) to ring numbers and their associated ports within a database of said switch;

providing indications in the database as to status of the ports mapped to the VLAN IDs;

transmitting the information contained in the database to the switches of a distributed TR bridge using a protocol that defines a communication exchange of messages between the switches, wherein the messages include periodically-exchanged messages and specifically-issued messages; and exchanging the specifically-issued messages when there is a change in status of any VLAN ID.

41. The method of claim 39, further comprising:

creating said database within said switch using the periodic and specifically-issued message exchanges; and ensuring coherency of the databases maintained by said switch using the periodic and specifically-issued message exchanges.

42. The method of claim 41, further comprising:

advertising the status of VLAN IDs associated with Concentrator Relay Functions (CRFs) and their ports of said logical switch fabric in accordance with a plurality of categories of advertisement messages distributed by said switch.

43. A switch apparatus, comprising:

means for containing a database within said switch, said database holding data to implement a logical switch fabric over a distributed token ring network of switches, said database including virtual local area network (VLAN) identifiers (IDs) that map to token ring network ring numbers and their associated ports within each switch of said network of switches, the database further including indications as to status of the ports mapped to the VLAN IDs; and means for distributing, by a protocol, the information contained in the database among the switches of the fabric, the protocol defining a communication exchange of messages between the switches.

44. The apparatus as in claim 43, further comprising:

means for creating said database within said switch using the periodic and specifically-issued message exchanges; and means for ensuring coherency of the databases maintained by said switch using the periodic and specifically-issued message exchanges.

45. The apparatus as in claim 43, further comprising:

means for advertising the status of VLAN IDs associated with Concentrator Relay Functions (CRFs) and their ports of said logical switch fabric in accordance with a plurality of categories of advertisement messages distributed by said switch.

* * * * *